United States Patent [19]
Morishima et al.

[11] Patent Number: 5,347,104

[45] Date of Patent: Sep. 13, 1994

[54] HEATER CONTROL CIRCUIT

[75] Inventors: Makoto Morishima; Yoshihiro Kanaya, both of Nagoya, Japan

[73] Assignee: Rinnai Kabushiki Kaisha, Nagoya, Japan

[21] Appl. No.: 887,421

[22] Filed: May 21, 1992

Related U.S. Application Data

[63] Continuation of Ser. No. 524,198, May 16, 1990, abandoned.

[30] Foreign Application Priority Data

Dec. 12, 1989 [JP] Japan .................. 1-321653

[51] Int. Cl.⁵ .................. H05B 3/68; H05B 3/02
[52] U.S. Cl. .................. 219/451; 219/507
[58] Field of Search ............... 219/464, 465, 448, 449, 219/451, 452, 466, 494, 497, 507, 508, 519; 307/112, 113; 363/50; 361/3, 115; 335/186

[56] References Cited

U.S. PATENT DOCUMENTS

| | | | |
|---|---|---|---|
| 3,355,574 | 11/1967 | Bassett | 219/464 |
| 4,025,883 | 5/1977 | Slade | 335/16 |
| 4,237,368 | 12/1980 | Welch | 219/464 |
| 4,447,710 | 5/1984 | McWilliams | 219/464 |
| 4,493,980 | 1/1985 | Payne | 219/494 |
| 4,551,616 | 11/1985 | Buttery | 219/464 |
| 4,634,843 | 1/1987 | Payne | 219/448 |
| 4,692,596 | 9/1987 | Payne | 219/494 |
| 4,758,710 | 7/1988 | Crossley | 219/464 |
| 4,788,398 | 11/1988 | Hornung | 219/497 |
| 4,788,415 | 11/1988 | Whipple | 219/508 |

*Primary Examiner*—Bruce A. Reynolds
*Assistant Examiner*—Michael D. Switzer
*Attorney, Agent, or Firm*—Robbins, Berliner & Carson

[57] ABSTRACT

A heater control circuit is provided to control the heating condition of a cooking oven by means of a triac. In the heater control circuit, an electrical heater is incorporated. The heater further has a switch which is electrically connected in series with the heater so as to actuate and deactuate the heater in combination with on-off operation of the switch. A control relay is electrically connected in series with the triac and the heater to be actuated and deactuated in association with on-off operation of the switch so as to break an electrically conductive path through the triac.

2 Claims, 1 Drawing Sheet

HEATER CONTROL CIRCUIT

This is a continuation of copending application(s) Ser. No. 07/524,198 filed on May 16, 1990 now abandoned.

FIELD OF THE INVENTION

This invention relates to a heater control circuit in which an electrical heater is controlled by a triac.

BACKGROUND OF THE INVENTION

In a cooking such as an electrical oven, small kitchen range and the like, an A.C. power source which is connected to house wiring has been employed. In many cases, a triac has been used to control an electrical heater mounted on the heater device since the triac causes no great noise, and at the same time, makes it possible to simplify the heater control circuit. In this instance, the triac is electrically connected in series with the electrical heater. The circuit in which the triac is in series with the electrical heater is further connected in series with an A.C. power source by way of a plug. In this situation, a surge current induced at the time of, for example, lightning, may flow through the house wiring and be drawn to the heater circuit of the device through the plug, thus causing damage to the triac due to the high voltage induced by the surge current.

In order to protect the device against surge voltage, a manual switch is connected to the device to make and break a conductive path toward the device, especially in the cases in which the device employs a house wiring rated at 200 volts. However, the cooking device is usually connected to the power source by way of the plug irrespective of whether the device is used or not. In this situation, it is desirable to cope with lightning without operating the manual switch each time the device is used.

SUMMARY OF THE INVENTION

An object of the invention is to provide a heater control circuit which is capable of automatically protecting the circuit against a surge current without any manual operation in the cases in which the device is connected to the power source by way of the plug irrespective of whether the device is used or not.

According to the present invention, there is provided a heater control circuit comprising an electrical heater provided to cook articles to be cooked, electrically connected to a connector of house wiring which has a power source; a triac electrically connected in series between the connector and the heater to control the heater; switch means electrically connected in series with the heater so as to actuate and deactuate the heater in combination with on-off operation of the switch means; and control means electrically connected in series with the triac and the heater to be actuated and deactuated in association with on-off operation of the switch means so as to break an electrically conductive path through the triac.

When the cooking device is used, the switch means is closed to energize the electrical heater by way of the triac which controls the quantity of heat generated by the heater. When the cooking device is not used, the switch means is opened, and the electrically conductive path through the triac toward the house wiring is broken by the control means in association with opening operation of the switch means. As a result, the surge current induced on the house wiring at the time of the lightening is interrupted from flowing through the triac.

In consequence, the heater control circuit is automatically protected against a surge current without any manual operation in the cases in which the device is connected to the power source by way of the plug irrespective of whether the device is used or not.

BRIEF DESCRIPTION OF THE DRAWINGS

In order that the invention may be more clearly understood, the following description is given by way of example only, with reference to the accompanying drawing in which.

DETAILED DESCRIPTION

Figure 1:
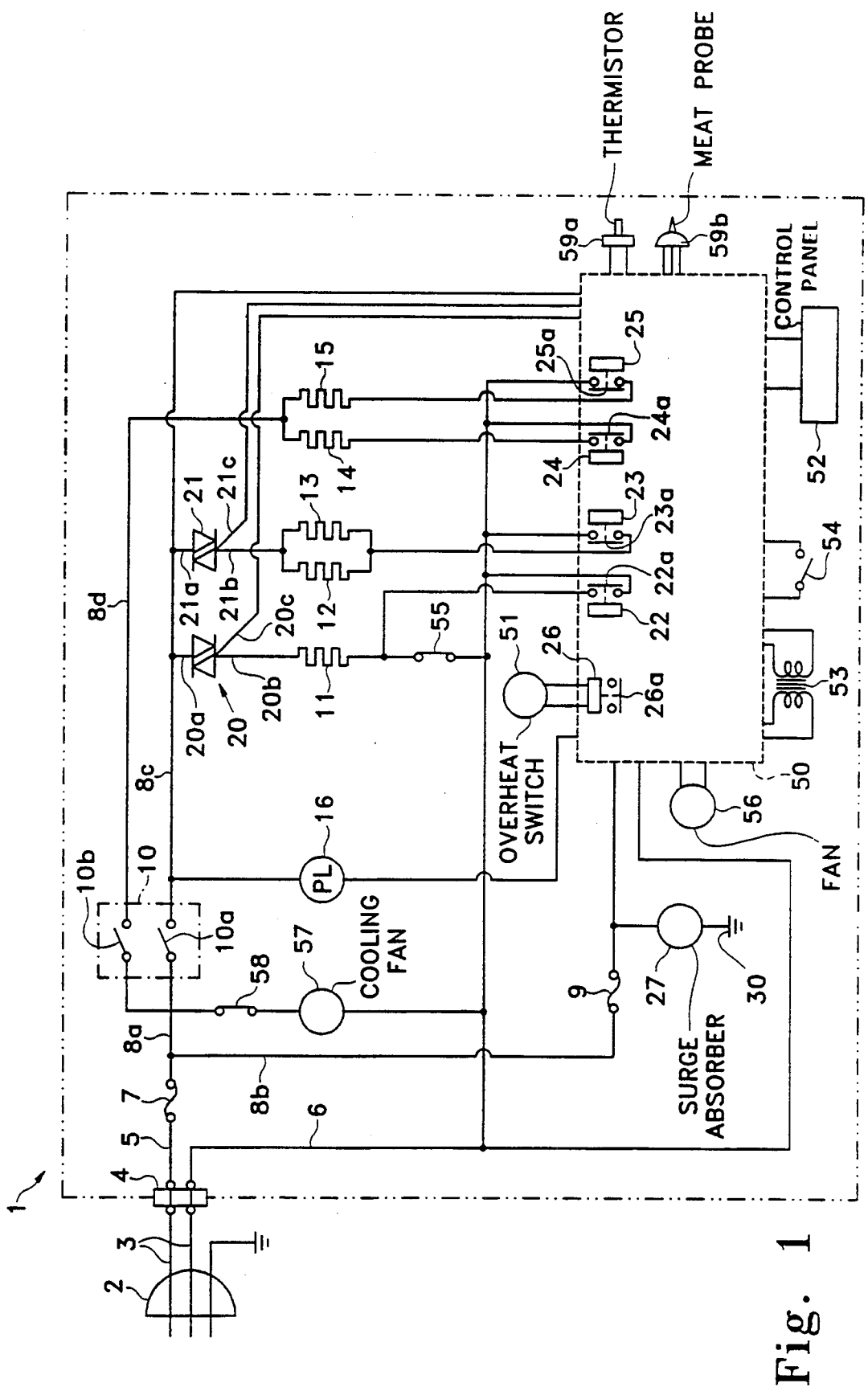
FIG. 1 is a schematic view of an electrical wiring connection of an electrical cooking oven according to an embodiment of the invention.

Referring to FIG. 1, an embodiment of the invention is shown which is incorporated into an electrical oven. The oven contains an electrical circuit 1 to which a commercial power source (single phase 200V) is supplied by way of an electrically conductive path. Three kinds of electrical heaters such as a clear halogen heater 11 (e.g. 700W), infrared halogen heaters 12, 13, (e.g. 700W) and sheath heaters 14, 15 (e.g. 1200W) are connected in parallel. Electrical power is adapted to be supplied to the circuit 1 by way of cords 3 and a plug 2 which is to be connected to an outlet connector (not shown) of a house wiring system. A power source line 5 and a common line 6 are connected to the cords 3 by way of terminals 4. Distributor lines 8a, 8b are connected to the power source by way of a fuse 7. Switch means 10 is connected to the distributor line 8a and comprises switches 10a, 10b. The switch 10a is adapted to open and close a conductive path 8c toward the clear halogen heater 11 and the infrared halogen heaters 12, 13. The other switch 10b is adapted to open and close a conductive path 8d toward the sheath heaters 14 and 15.

Meanwhile, the distributor line 8b is connected to a control circuit 50 by way of a fuse 9. A pilot lamp 16 is connected between the path 8c and the control circuit 50. The control circuit 50 is adapted to detect the switching condition of the switch 10a.

In parallel with the pilot lamp 16, a second anode 20a of a triac 20 is connected by way of a first anode 20b between the path 8c and the clear halogen heater 11 to control the heater 11. A second anode 21a of a triac 12 is connected by way of a first anode 21b between the path 8c and the infrared halogen heaters 12 and 13 to control these heaters 12 and 13.

The clear halogen heater 11 is further connected to the common line 6 by way of a contact 22a of a relay 22 which is incorporated into the control circuit 50. The infrared halogen heaters 12 and 13, which are in parallel with each other, are connected to the common line 6 by way of a contact 23a of a relay 23 which is incorporated into the control circuit 50. In this instance, the relays 22 and 23 work as control means in this invention.

Each gate 20c or 21c of the triac 20 or 21 respectively, is connected to the control circuit 50 which is adapted to transmit control signals. On the other hand, the ends of the sheath heaters 14 and 15 are connected to the conductive path 8d, and the other ends of the heaters 14 and 15 are connected to the common line 6 by way of contacts 24a and 25a, respectively, of relays 24 and 25, respectively, which are incorporated into the control circuit 50.

An overheat switch 51 is secured to detect abnormal temperature rise of the cooking chamber of the oven and opens a contact 26a of a relay 26.

In relays 22, 23, 24, 25 of the control circuit 50, the contacts 22a, 23a, 24a, 25a are closable as long as the relay 26 keeps its contact 26a closed.

Once the overheat switch 51 detected the abnormal temperature rise, the relay 26 keeps the contact 26a open even when the temperature returns to normal, unless the switch means 10 is opened.

A surge absorber 27 is connected between the distributor line 8b and a ground 30. The control circuit 50 has a control panel 52 and a thermistor 59a to control the relays 22-25, and at the same time, transmitting the control signals according to the operation.

A transformer 53, fuse 54, and door switch 55 are provided. A fan 56 is provided to stir the air within the oven. A cooling fan 57 is activated by a thermoswitch 58. The oven also includes a meat probe 59b.

In operation, the switch means 10 is closed so that the conductive path 8d toward the sheath heaters 14 and 15 is closed, while the conductive path 8c toward the triacs 20 and 21 is closed. The control panel 52 and control circuit 50 are operated, and the contacts 22a-25a of the relays 22-25 are closed, in such a manner as to energize the heaters 11-15 with the triacs 20 and 21 suitably controlled depending on the panel 52.

When the oven is not used, the switch means 10 is opened to break the distributor line 8a and the conductive path 8d, while the relays 22 and 23 allow their contacts 22a, 23a to open and thus break electrical connection between the triacs 20 and 21 and the house wiring. A surge current induced on the house wiring by lightning is interrupted from being drawn to the triacs 20 and 21.

We claim:

1. A heater control circuit comprising:
   an electrical heater provided to cook articles to be cooked, and electrically connected across respective first and second terminals of a house wiring connector for connection to a power source;
   a triac having first and second anodes and electrically connected in series between the first connector terminal and the heater to control the heater;
   manually operable switch means electrically coupled to the heater so as to actuate and deactuate the heater in response to respective on and off operation of the switch means, said switch means being electrically connected in series between the first connector terminal and the first triac anode; and
   control means electrically coupled to the heater and the triac for controlling the heater and comprising a pair of normally open relay contacts, closeable only upon on operation of said switch means and electrically connected in series with the heater so as to actuate and deactuate the heater, said relay contacts being also electrically connected in series between the second connector terminal and the second triac anode and opened in response to the off operation of the switch means,
   whereby the off operation of the switch means will open a first electrically conductive path through the switch means from the first connector terminal to the first anode of the triac and will also cause the control means to open a second electrically conductive path from the second connector terminal through the heater and the relay contacts to the second anode of the triac.

2. A heater control circuit according to claim 1, wherein the heater is an infrared halogen heater.

* * * * *